Dec. 22, 1970     J. W. CROOKS     3,548,681
MULTIPLE SPEED POWER SHIFT TRANSMISSION
Filed June 23, 1969     4 Sheets-Sheet 2

Inventor
James W. Crooks
Attorneys

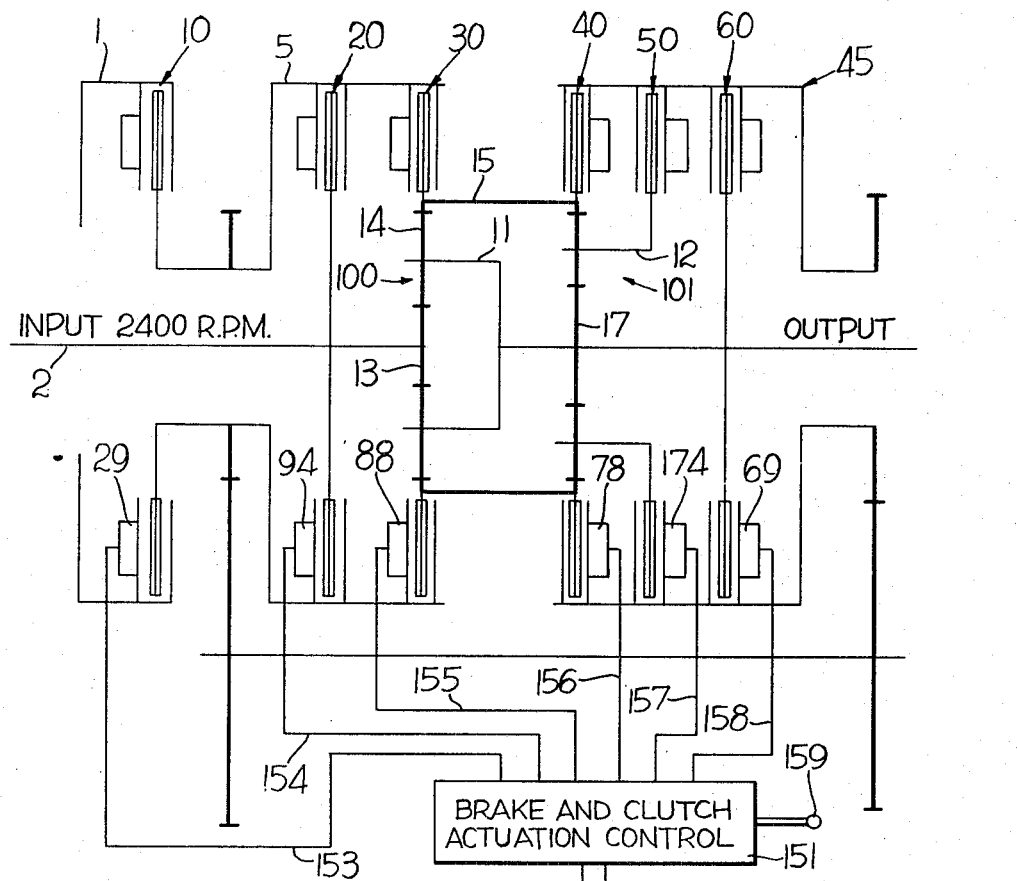

United States Patent Office 3,548,681
Patented Dec. 22, 1970

3,548,681
MULTIPLE SPEED POWER SHIFT TRANSMISSION
James W. Crooks, Whitefish Bay, Wis., assignor to Allis-Chalmers Manufacturing Company, Milwaukee, Wis.
Filed June 23, 1969, Ser. No. 835,672
Int. Cl. F16h 37/06; B60k 17/28
U.S. Cl. 74—682
11 Claims

ABSTRACT OF THE DISCLOSURE

A vehicle transmission having two planetary gearsets and a countershaft gearset with rotatable input and output clutch housing carrying clutches selectively engaging clutch discs carried on the elements of the planetary gearsets to thereby provide a plurality of speed ratios for the transmission.

---

This invention relates to a vehicle transmission and more particularly to a power shift transmission having two planetary gearsets and a countershaft gearset. An input clutch housing and an output clutch housing rotate concentrically with the planetary gearsets and carry selectively actuated clutches having friction members carried on the ring gear, sun gear, or planetary elements to provide a plurality of gear ratios for the transmission.

The conventional power shift transmission employs a power actuator to frictionally engage two clutch plates for transmission of power through the clutch. The actuation of the actuator for power shifting may be electrical or hydraulic or any suitable actuating means. Hydraulic actuators are most generally used inasmuch as tractors often use pressurized fluid to operate other systems on the tractor. It is desirable that the power shift transmission keep the number of actuators to a minimum and the actuators may actuate clutches or brakes to provide the desired gear change and alternate power path through the transmission. It is desirable that the transmission employ as few transition shifts as possible and yet provide a high number of gear ratios.

It is also desirable that the transmission be simplified to reduce the machining and construction costs in general and be rugged enough to withstand heavy duty use which a power transmission of this type is subjected to.

Accordingly, this invention provides a power shift transmission having seven speeds forward and one reverse speed. The transmission is mounted within a case and extends between two walls in the transmission case which fully and adequately supports the transmission for all operations. The transmission includes essentially two planetary gearsets for transmitting power through the transmission and an input and output clutch housing carrying clutches selectively engaging clutch components of each planetary gearset to provide a shifting of the gear ratios for the transmission. In combination with the two planetary gearsets is a countershaft gearset to counterrotate the clutch housings. The transmission provides a means of transmitting power through one planetary gearset, both planetary gearsets, and/or power through the countershaft of gearset as the power requirements of the transmission are required.

Accordingly, it is an object of this invention to provide a power shift transmission having seven speeds forward and one reverse speed by the use of two planetary gearsets and a countershaft gearset operating in combination through a plurality of clutches to selectively provide plural power paths and gear ratios through the transmission.

It is another object of this invention to provide a power shift transmission having an input and an output shaft driving through a first and second planetary gearset and also a countershaft gearset connected to an input clutch housing and an output clutch housing with each of the clutch housings carrying clutches for selectively engaging a friction member of the clutch carried by elements of the planetary gearsets to provide the selective gear ranges.

It is a further object of this invention to provide a power shift transmission having a minimum number of clutches and transition shifts with a maximum number of gear ratios.

It is a further object of this invention to provide a power shift transmission having annular hydraulic actuators carried on the transmission which is supported in end walls of the transmission case and includes two planetary gearsets and a countershaft gearset to selectively provide a plurality of speed ratios for the transmission.

The objects of this invention are accomplished by providing an input and an output shaft in a transmission. The input shaft is connected to the sun gear of the first planetary gearset and the output shaft is connected to the sun gear of the second planetary gearset and the planetary carrier in the first planetary gearset. An input clutch housing is mounted for rotation about the axial center of the input shaft and carries a plurality of clutches each having a friction member connected to a component of the first planetary gearset. An output clutch housing rotates about the axial center of the output shaft and carries a pluraliy of clutches each having a friction member connected to a component on the second planetary gearset. The input clutch housing and the output clutch housing each carry a gear which is connected through a countershaft to counterrotate each housing relative to each other. Suitable actuators are carried on the clutch housing to selectively engage and disengage one or more clutches to provide a plurality of power paths through the transmission and provide the wide range of gear ratios.

The preferred embodiments of this inventions are illustrated in the attached drawings.

FIGS. 1a, 1b, and 1c illustrate a cross section of the transmission.

FIG. 2 illustrates schematically the transmission shown in FIGS. 1a, 1b and 1c.

FIG. 3 illustrates a table of the gear ranges and gear ratios for the transmission when actuating the clutches as indicated.

Figure 1A:
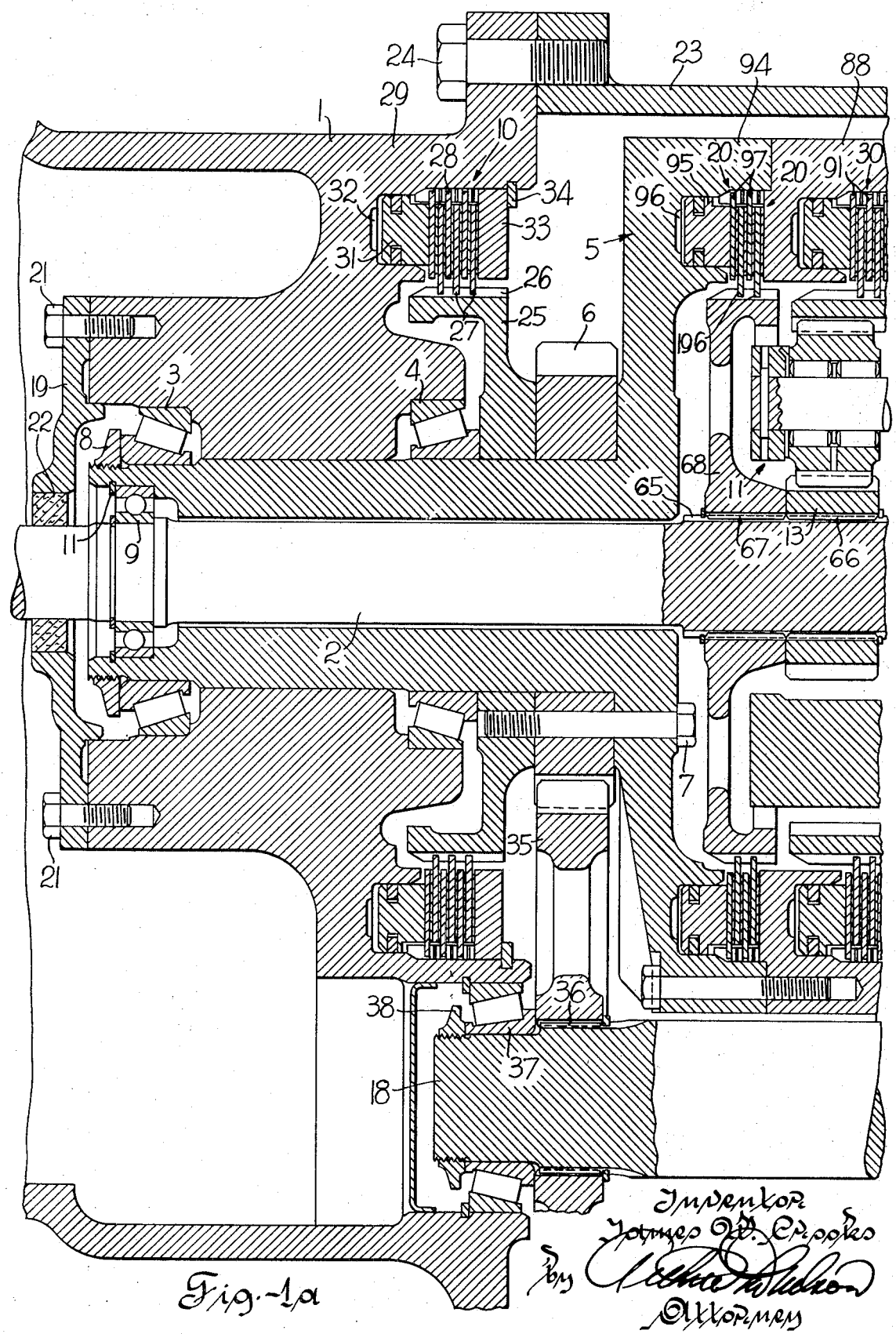
Figure 1B:
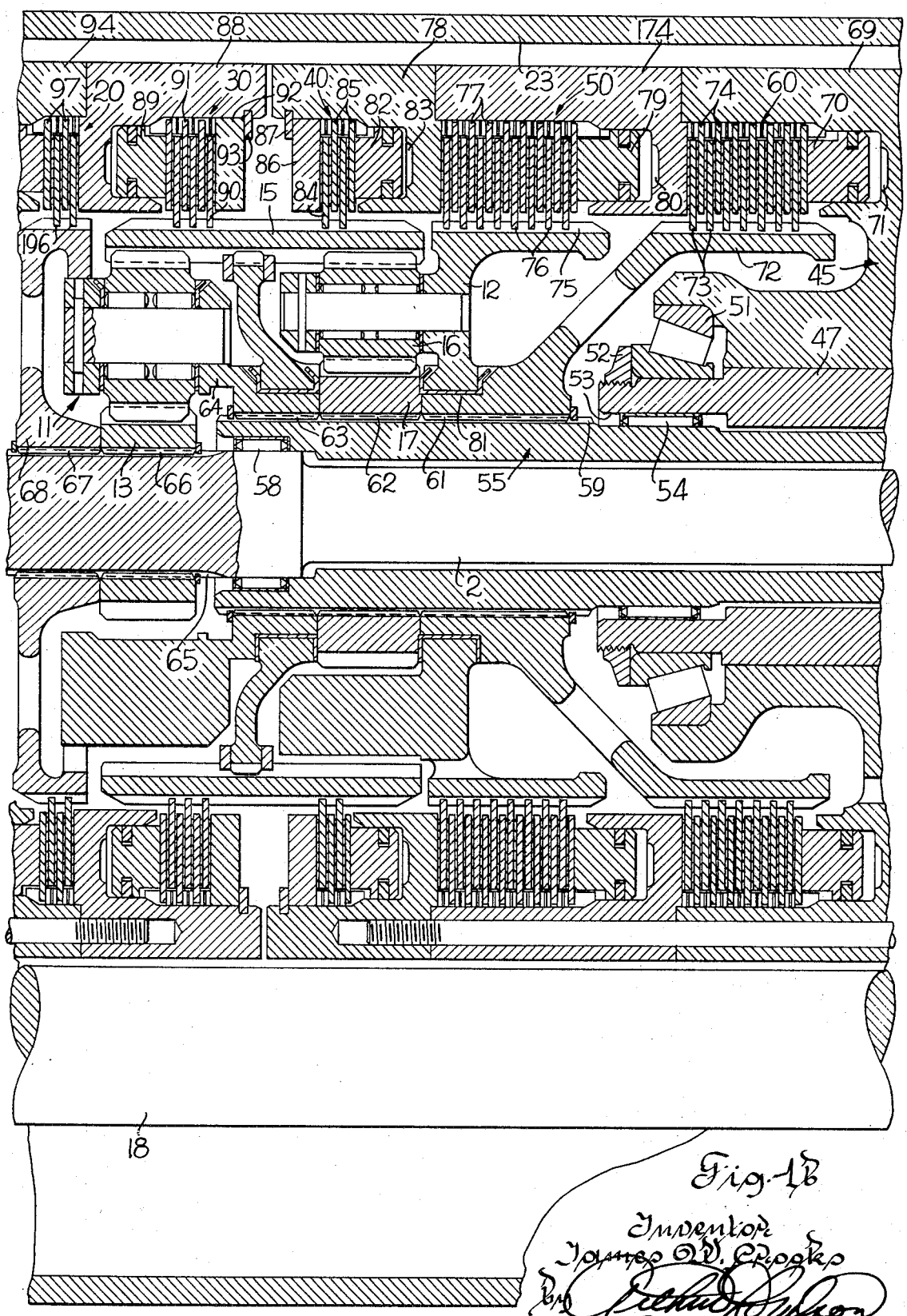
Figure 1C:
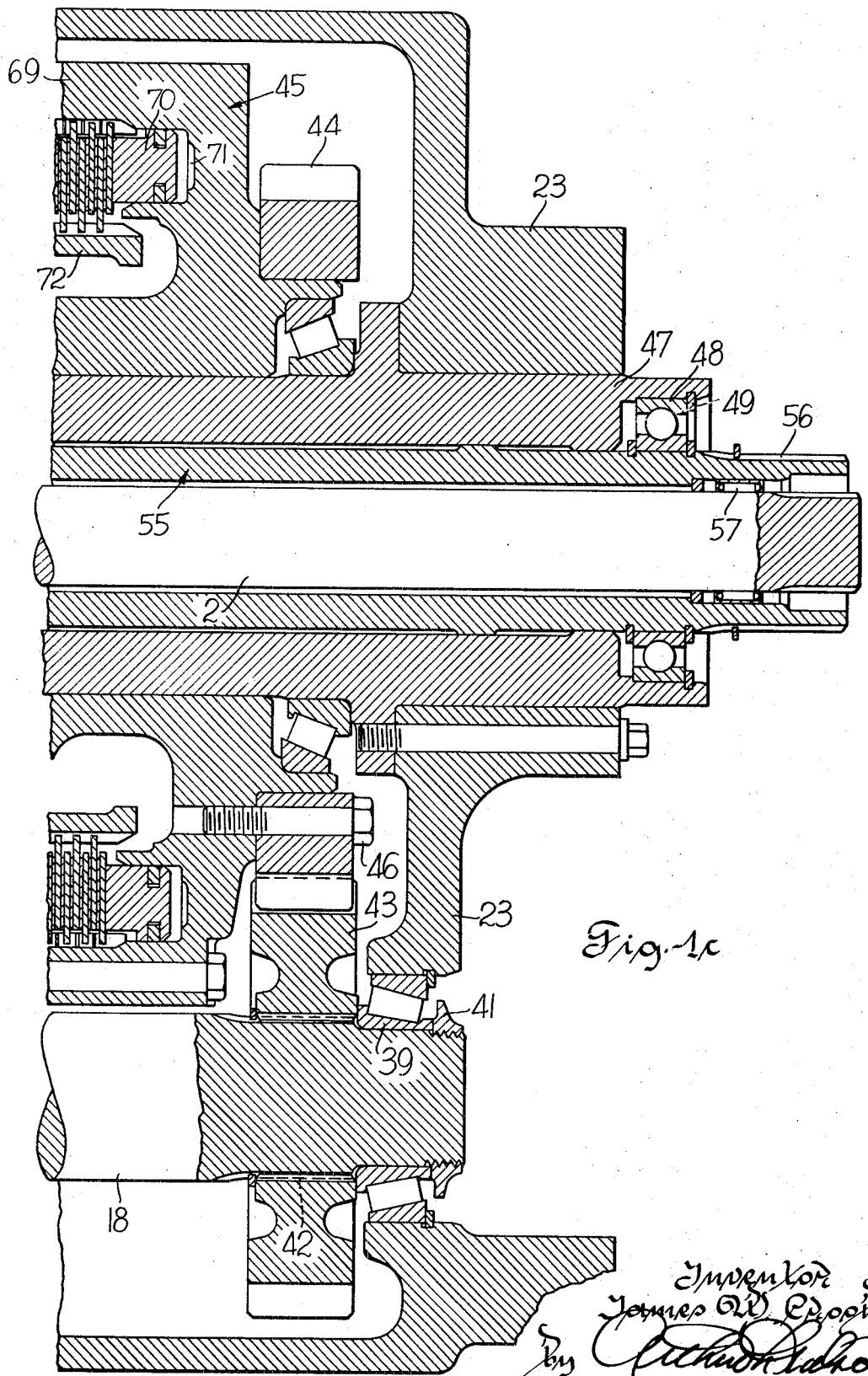

Referring to FIGS. 1a, 1b and 1c, the housing 1 is connected to the vehicle chassis and engine and houses the input drive shaft 2. The housing 1 receives the bearing assemblies 3 and 4 which embrace the input clutch housing 5, and the input clutch housing is also encircled by a drive gear 6 which is fastened by means of a plurality of bolts 7. The bearing assembly 3 is locked on the housing by the retainer 8. The input shaft 2 is rotatably mounted within the bearing assembly 9 received within the end of the input clutch housing 5 and retained by the snap ring 11. The end plate 19 is fastened by a plurality of bolts 21 and circles sealing assembly 22 which seals the end of the input shaft 2. The housing 1 is fastened to the transmission case 23 by means of a plurality of bolts 24. The drum 25 is also fastened to the input clutch housing and forms an external spline 26 to receive a plurality of brake discs 27. Interposed between the brake discs 27 are a plurality of brake discs 28 fastened to the housing 1. The housing 1 defines the hydraulic cylinder 29 which receives the annular piston 31 and defines the pressurizing chamber 32 for actuating the piston to compress the brake discs against the reaction plate 33 which is received within the housing 1 and retained by the snap ring 34. The drive gear 6 drives the spur gear 35 which is seated on spline 36 of countershaft 18. The countershaft 18 is rotatably supported by the bearing assembly 37 within housing 1 and retained in position on the shaft by the retainer 38. The countershaft 18 is supported at its opposite end by the casing 23. The casing 23 receives a bearing assembly 39 supporting the countershaft 18 and retained in position by the retainer 41. The countershaft 18 is formed with a spline 42 mating the spline of pinion gear 43. Pinion gear 43 drives the driven gear 44 which is fastened to the output clutch housing 45 by means of a plurality of bolts 46. The casing 23 receives the support sleeve 47 which encircles the bearing assembly 48 and locked by the retainer ring 49. The support sleeve extends axially into the transmission assembly to support a bearing assembly 51 which is retained within a recess by a retainer 52. The support sleeve 47 is formed with an annular recess 53 receiving the needle bearing assembly 54 which supports the quill shaft 55. The quill shaft 55 is rotatably mounted in the bearing assembly 48 and is formed with the spline 56 on its exterior end.

The quill shaft 55 receives the needle bearing 57 and the needle bearing 58 which engages the outer periphery of the input shaft 2 to provide concentric rotation of the input and output shafts.

The intermediate portion of the quill shaft 55 is formed with an external spline 59 which receives the mating spline 61 of the sleeve 72, the spline of 62 of the sun gear 17, and the spline 63 of the supporting end 64 of the planetary carrier 11. The external periphery of the input shaft 2 on its intermediate portion defines a spline 65 which receives the mating splines 66 of sun gear 13 and a spline 67 on the clutch hub 68.

The output clutch housing 45 defines a hydraulic cylinder 69 which receives the annular piston 70 and defines a pressurizing chamber 71 for actuating the clutch 60. The sleeve 72 is supported on the quill shaft 55 and is splined on the external periphery to receive mating splined portions of the clutch discs 73 which are interposed between clutch discs 74. Discs 74 are seated on a splined portion of the cylinder 69 of the output clutch housing 45. The annular cylinder 174 has a facing engaging the clutch discs which operates as a reaction plate for the clutch 60.

The planetary carrier 12 is also formed with a spline 75 on its external periphery for receiving a plurality of discs 76. The internal periphery of the clutch housing defining the cylinder 174 is also formed with a splined portion to receive a plurality of discs 77 interposed between the discs 76. The back facing of the annular cylinder 78 operates as a reaction plate for the clutch 50.

The annular hydraulic cylinder 174 receives the annular piston 79 and forms a pressurized chamber 80 for receiving pressurized fluid for actuating clutch 50. The planetary carrier 12 is seated on a bushing 81 on the external periphery of the small end of sleeve 72 and rotates relative to the sleeve. The hydraulic cylinder 78 on the output clutch housing 45 receives the piston 82 defining a pressurizing chamber 83 for actuating the clutch 40. The ring gear 15 has a splined external periphery for receiving a plurality of discs 84 which are interposed between the disc 85 on the inner periphery of the clutch housing 45. The reaction plane 86 is retained in the clutch housing by the snap ring 87. Accordingly, the clutch 40 provides a means of clutching between the output clutch housing 45 and the ring gear 15. The clutch 50 provides a clutching means between the output clutch housing 45 and the carrier 12 while the clutch 60 provides a clutching means between the sun gear 17 and the clutch housing 45.

The input clutch housing 5 defines a cylinder 88 for receiving piston 89 for operating the clutch 30. The ring gear 15 receives a plurality of clutch discs 90 which are interposed between the plurality of clutch discs 91 on the input clutch housing 5. The disc stack of the clutch 30 is compressed against the reaction plate 92 which is fastened in the clutch housing by the snap ring 93.

The input clutch housing further defines an annular hydraulic cylinder 94 which receives an annular hydraulic piston 95 defining a pressurizing chamber 96. The backside of the annular cylinder 88 operates as a reaction plate for the compression of the disc clutch of the clutch 20. The clutch hub 68 supports the clutch discs 196 which is interposed between the clutch discs 97 on the input clutch housing to thereby clutch the sun gear 13 to the input clutch housing 5.

FIG. 2 illustrates schematically the transmission shown in FIGS. 1a, 1b and 1c. The brake 10 is shown on housing 1 for braking the clutch housing 5. The clutch housing 5 is rotatably supported concentrically with the input shaft 2. The clutch 20 provides a clutching means between the clutch housing 5 and the sun gear 13. The input clutch housing 5 also carries a clutch 30 which is clutched to the ring gear 15. The planetary gears 14 are supported on the planetary carrier 11 which is connected to the sun gear 17 of the second planetary gearset. The sun gear 17 is also clutched to the output clutch housing 45 by means of the clutch 60.

The clutch housing 45 is clutched to planetary carrier 12 by means of the clutch 50. The clutch 40 provides clutching means between the output clutch housing 45 and the ring gear 15. The ring gear 15 operates as the ring gear for the first planetary gearset 100 as well as the second gearset 101.

FIG. 2 further illustrates a hydraulic actuating system including a source of pressurized fluid and means for actuating the brake and clutches. The pump 150 receives hydraulic fluid from the reservoir 251 and supplies pressurized fluid to the brake and clutch actuation control 151. Hydraulic fluid is returned from the brake and clutch actuation control to the reservoir 251 through conduit 152. The brake 10 and the clutches 20, 30, 40, 50 and 60 are actuated by the cylinders 29, 94, 88, 78, 174 and 69, respectively. A plurality of conduits 153, 154, 155, 156, 157 and 158 connect the brake and clutch actuation control 151 to the cylinders 29, 94, 88, 78, 174 and 69, respectively. The lever 159 operates the brake and clutch actuation control 151 to selectively operate the hydraulic cylinders for the brake and clutches. Any sequence of combination of one or more of the annular cylinders 29, 94, 88, 78, 174 or 69 can be actuated to provide power transmission through the desired gear ratio and gear ranges as indicated in the table on FIG. 3.

FIG. 3 illustrates a table of the gear ranges when the clutches actuate as well as the speed ratio of the transmission; the speed ratio being the number of turns the input shaft will make to a single turn of the output shaft.

Referring to FIGS. 1a, 1b and 1c, 2 and 3, the transmission illustrated in these figures will be described. The transmission is operated by selectively actuating the brake and clutches to provide the desired gear ratio. When the reverse gear is engaged, the clutch 60 is actuated to clutch the output clutch housing 45 to the sun gear 17 and the clutch 30 on the input clutch housing 5 is actuated which causes the input torque to pass through the sun gear 13 to the carrier and ring gear of the first planetary gearset 100. The ring gear torque is then in a negative direction and is connected to the countershaft gear train by the clutch 30. This negative torque is multiplied by the countershaft gearset and transferred to the carrier output by means of the clutch 60. The difference between the positive torque given to the carrier by the sun gear and the negative torque given to the carrier by the ring gear multiplied by the countershaft gears gives a net resultant negative torque to the output shaft.

When the transmission is positioned in the first forward gear range as indicated by the table in FIG. 3, the clutch 50 engages the planetary carrier on the second planetary gearset with the output clutch housing 45 and the clutch 30 engages the ring gear 15 with the input clutch housing 5. The input torque passes to the sun gear 13 and a positive torque is transferred to the carrier 11 and negative torque is transferred to the portion of the ring gear meshing with the front planetary gears 14.

gear meshing with the rear planetary gear 16 in the rear planetary gearset and contributes torque to the carrier 12. The torque on the carrier 12 is regenerated through the clutch 50 and the countershaft gearset and clutch 30 back to the ring gear 15. This results in a much higher negative torque on the portion of the ring gear meshing with the rear planetary gears than the reaction of the front planetary gears 14. The reaction to the negative torque on the portion of the ring gear meshing with the rear planetary gears is positive on the sun gear 17 so that this positive reaction is added to the torque on the carrier 11 resulting in a higher numerical torque ratio multiplication of the output quill shaft 55.

When the transmission is shifted into second speed as indicated by the gear range two in FIG. 3, the clutch 50 engages the planetary carrier 12 of the second planetary gearset while the brake 10 engages the input clutch housing 5. The input torque passes to the sun gear 13. The carrier 12 is held by the clutch 50 through the countershaft gearset and the brake 10 which grounds the input clutch housing 5. The torque on the sun gear 13 is transferred as a positive torque to the carrier 11 and the negative torque to the ring gear 15. The negative torque on the ring gear 15 is converted to a positive torque on the sun gear 17 which adds to the torque of the carrier 11 to give a positive torque at the output quill shaft 55.

With the transmission in the gear range 3 as indicated in FIG. 3, the clutch 30 engages the ring gear 15 and the brake 10 engages the input clutch housing 5 allowing the carrier of the second planetary gearset to rotate freely. The input torque passes through the sun gear 13 while the ring gear 15 is held by the clutch 30 and grounded by the brake 10. With the ring gear stopped a simple planetary reduction to the output quill shaft 55 is provided.

With the transmission in the fourth gear range as indicated in the table of FIG. 3, the clutch 60 engages the output clutch housing 45 with the sun gear 17 while the clutch 20 engages the sun gear 13 of the first planetary gearset. The input torque passes to the countershaft gear train through the clutch 20 and the input torque is multiplied by the countershaft gear train and transferred to the output shaft by the clutch 60. The planetary gearsets have no function for this particular gear range as the power is transmitted through the countershaft gearing.

With the transmission in the fifth gear range as shown in the table of FIG. 3, the clutch 50 engages a planetary carrier of the second planetary gearset while the clutch 20 engages the sun gear of the first planetary gearset and the input torque passing to both sun gear 13 and clutch housing 5. The portion of the torque given to the clutch 20 and input clutch housing 5 is multiplied by the countershaft gearset and transferred to the carrier 12 of the second planetary gearset through the clutch 50. The portion of the resultant torque on the carrier 12 of the second planetary gearset becomes reaction for the torque on the carrier 11 on the first planetary gearset and the other portion of the torque on the carrier 12 of the second planetary gearset is added to the output quill shaft 55 through the sun gear 17. The output torque is the sum resultant torque on the sun gear 17 and the resultant torque on the carrier 11 of the first planetary gearset.

When the transmission is in the sixth gear range indicated on the table in FIG. 3, the clutch 40 engages the ring gear 15 with the output clutch housing 45 while the clutch 20 engages the sun gear 13 of the first planetary gearset with the input clutch housing 5 providing the input torque to both sun gear 13 and the input clutch housing 5. The portion of the torque transferred to the input clutch housing 5 through clutch 20 is multiplied by the countershaft gearset and transferred to the ring gear 15 by the clutch 40. The output torque is the sum of the resultant ring gear torque and the portion of the input torque going to the sun gear 13.

With the transmission in the seventh gear range as indicated on the table of FIG. 3, the sun gear 13 of the first planetary gearset is clutched to the input clutch housing 5 by the clutch 20 while the ring gear 15 is clutched to the input clutch housing 5 by the clutch 30. The input torque passes to the sun gear 13 and the input clutch housing through clutch 20. The clutch 20 drives clutch 30 which is connected to the ring gear of the first planetary gearset. The planetary gearset is thereby locked together by the clutches 20 and 30 giving a direct drive to the output quill shaft 55.

A transmission can also be braked by the clutching of clutch 60 to the sun gear 17 on the second plantary gearset while the brake 10 breaks the input clutch housing 5. This provides for braking as the torque passes from the output quill shaft 55 to the clutch 60. This torque is then reduced by the countershaft gearset and transferred to the brake 10 which grounds the input clutch housing 5. The braking torque is controlled by the clutch 60 and brake 10 to break the transmission.

The transmission includes a first and second planetary gearset with countershaft gearing. The input clutch housing is provided with clutching and braking means. The output clutch housing is also provided with clutching means to provide a plurality of speed ranges through the planetary gearsets or the countershaft gearset and accordingly provides a seven speed transmission.

The preferred embodiments of this invention have been illustrated and described.

The embodiments of the invention in which an exclusive property or privilege is claimed are defined as follows:

1. A transmission comprising an input shaft and an output shaft rotatably mounted in a transmission case, a first planetary gearset having a sun gear driven by said input shaft, a second planetary gearset having a sun gear connected to the planetary carrier of said first planetary gearset and driving said output shaft, means connecting the ring gears of said first and second planetary gearsets, an input clutch housing rotatably mounted for concentric rotation with said input shaft, an output clutch housing mounted for concentric rotation with said output shaft, a brake mounted on said transmission case having a brake member connected to said input clutch housing for braking said input clutch housing relative to said transmission case, a drive gear connected to the input clutch housing, a driven gear connected to the output clutch housing, a countershaft gearset including a countershaft having gears connected to said drive and driven gears on said clutch housings, two clutches mounted on said input clutch housing, each clutch including a single friction member singularly connected to an element of two of the elements of said first planetary gearset, including the ring gear, the planetary carrier, and the sun gear for selectively clutching each element to said input housing, a plurality of clutches connected to the output clutch housing, each clutch including a single friction member singularly connected to an element of each of the elements of said second planetary gearset consisting of the ring gear, planetary carrier, and the sun gear for selectively clutching said elements to the output clutch housing, means for selectively engaging said clutches and brake to selectively provide power paths through said transmission.

2. A transmission as set forth in claim 1 wherein said transmission includes a clutch mounted on the input clutch housing having a friction member connected to the ring gear of said first planetary gearset, a clutch mounted on the output clutch housing having a friction member connected to the sun gear of said second planetary gearset to provide a positive torque through said first planetary gearset and negative torque through the countershaft gearset to provide additive resultant negative torque to the output drive shaft and reverse rotation of said output shaft.

3. A transmission as set forth in claim 1 wherein a clutch mounted on the input clutch housing clutches a friction member on the ring gear of said first planetary gearset, a clutch on said output clutch housing clutches a friction member on the carrier of said second planetary gearset to provide positive torque to the first planetary carrier and negative torque to the second planetary carrier and negative torque through the countershaft gearset so the additive reaction is a positive torque resulting in high torque ratio on the output shaft.

4. A transmission as set forth in claim 1 wherein said brake breaks the input clutch housing to the transmission case, a clutch on the output clutch housing includes a friction member connected to the planetary carrier of the second planetary gearset to provide positive torque to the carrier of the first planetary gearset and positive torque to the sun gear of the second planetary gearset to provide additive positive torque output on the output shaft of said transmission.

5. A transmission as set forth in claim 1 wherein said brake including the brake member brakes the input clutch housing to the transmission case, a clutch on the input clutch housing includes a friction member on the ring gear of the first planetary gearset to thereby ground the input clutch housing and provide a simple planetary reduction to the output shaft of said transmission.

6. A transmission as set forth in claim 1 wherein a clutch on the input clutch housing includes a friction member connected to the sun gear of the first planetary gearset, a clutch on the output clutch housing includes a friction member connected to the sun gear of the second planetary gearset whereby the input torque to the input shaft is multiplied by the countershaft gearset and transferred to the output shaft by the clutch on the output clutch housing to provide drive through the countershaft gearset.

7. A transmission as set forth in claim 1 wherein a clutch on the input housing includes a friction member connected to the sun gear of the first planetary gearset, a clutch on the output clutch housing includes a friction member on the planetary carrier of the second planetary gearset to provide torque multiplied by the countershaft gearset and transferred through the output clutch housing to the carrier of the second planetary gearset, thereby providing a resultant positive torque which is the sum of the torque on the sun gear and the resultant torque from the carrier of the first planetary gearset.

8. A transmission as set forth in claim 1 wherein a clutch on the input clutch housing includes a friction member connected to the gun gear of the first planetary gearset, a clutch on the output clutch housing includes a friction member connected to the ring gear of the second planetary gearset to provide torque multiplication by the countershaft gearset transferred to the ring gear of the second planetary gearset with an output torque which is the sum of the resultant ring gear torque and portion of the input torque on the sun gear of the first planetary gearset.

9. A transmission as set forth in claim 1 wherein input clutch housing includes a friction member connected to the sun gear of the first planetary gearset, a clutch on the output clutch housing includes a friction member on the ring gear of the first planetary gearset to thereby lock the first planetary gearset and provide a direct drive to the output drive shaft.

10. A transmission as set forth in claim 1 wherein said brake brakes the input clutch housing to the transmission case, a clutch on said output clutch housing includes a friction element connected to the sun gear of said second planetary gearset to thereby provide for braking of the output shaft by braking the input clutch housing and locking the output clutch housing through countershaft gearset while permitting the input shaft to rotate.

11. A transmission as set forth in claim 10 wherein said output shaft is a quill shaft receiving an input shaft extending through said quill shaft and adapted for power takeoff.

References Cited

UNITED STATES PATENTS

| | | | |
|---|---|---|---|
| 2,511,039 | 6/1950 | Black et al. | 74—720 |
| 2,793,533 | 5/1957 | Swenson et al. | 74—15.63 |
| 2,932,202 | 4/1960 | Rinkema | 74—15.63X |
| 3,065,643 | 11/1962 | Mark et al. | 74—15.63 |
| 3,430,518 | 3/1969 | Auriol | 74—705 |
| 3,487,724 | 1/1970 | McIntyre et al. | 74—15.6X |
| 3,487,723 | 1/1970 | Piot | 74—682 |

ARTHUR T. McKEON, Primary Examiner

U.S. Cl. X.R.

74—674, 705, 15.63